April 16, 1940.   G. ULBRICHT ET AL   2,197,353
IMPULSE-RECEIVING SYSTEM FOR DIRECTION FINDERS
Filed Aug. 28, 1937

INVENTORS
GUNTHER ULBRICHT AND
RUDOLPH WEBER
BY
ATTORNEY

Patented Apr. 16, 1940

2,197,353

UNITED STATES PATENT OFFICE 2,197,353

IMPULSE-RECEIVING SYSTEM FOR DIRECTION FINDERS

Gunther Ulbricht and Rudolf Weber, Berlin, Germany, assignors, by mesne assignments, to Telefunken Gesellschaft für Drahtlose Telegraphie m. b. H., Berlin, Germany, a corporation of Germany Application August 28, 1937, Serial No. 161,486
In Germany August 17, 1936

2 Claims. (Cl. 250—11)

The present invention is concerned with an impulse receiving system suited for direction-finding work.

In impulse direction finding, as known from the prior art, the transmitter or beacon station sends out brief impulses of high frequency, and at the receiving end the impulses coming in via the direct route (ground wave) and the impulses coming in by way of the Heaviside layer (sky or space wave) are reproduced separately. Direction finding or the taking of bearings is effected by turning the loop or frame until the impulses of the ground wave disappear. The precision of such direction-finding work is a function of the angle through which the loop may be turned without the impulses of the ground wave being noticed. In practice the demanded accuracy ranges between 1 and 1.5 degrees, this being called the "minimum-signal width."

The minimum-signal width angle depends largely upon the design of the receiver circuit, including the radio frequency rectifier. If a square-law rectifier is employed, then it will be seen that the decrease of potential prevailing at the output end can not be directly proportional to the input potential. For instance, if by rotation of the loop the input potential is cut down to one-fifth, this means that the output potential will drop to one-twenty-fifth because of the square-law action of the rectifier. But if in such a case a linear or straight-line law rectifier is employed, then the output potential would drop to only one-fifth. This makes it clear what advantages the use of a straight-line rectifier offers in practice. However, since such a rectifier has heretofore not been available in ideal form, recourse must be had in practice to other ways and means.

The impulse direction-finding outfit here disclosed has the outstanding feature that the receiver is of the heterodyne type.

For a better understanding of our invention its structure and mode of operation are illustrated in the accompanying drawing, wherein.

Figure 1:
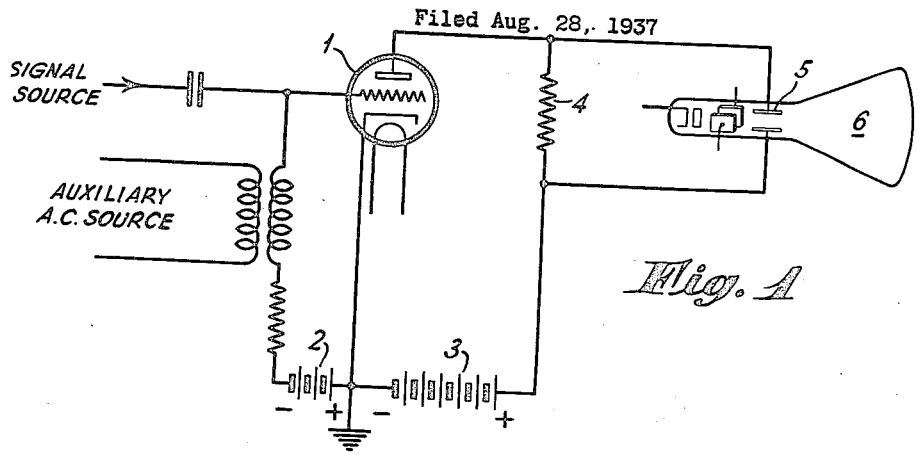
Figure 1 shows the basic circuit scheme of a plate-type rectifier to the output of which is associated a pair of deflector plates of a Braun tube.

Radio beacon signals of the high frequency are here assumed to be in the form of keyed impulses of short duration. The impulse potentials are impressed upon the grid of tube 1 which is subject to a bias potential from the direct current source 2. In the output circuit for the tube 1 is a source 3 and a resistor 4. A potential drop is developed across this resistor which corresponds to the rectified impulse potentials. In shunt with the resistor 4 is a pair of deflection plates 5 of a cathode ray tube 6.

As a result of carrying out the invention in the manner herein set forth the signals when received at small amplitude are not rectified and amplified by a greater gain ratio than the stronger signals. Hence the minimum signal zone is limited to a smaller angle. With rectifiers as at present known it has been difficult to accomplish this result, particularly where the apparatus is designed to accept a wide range of amplitudes of the incoming signals. Diode rectifiers are certainly not best adapted to perform this function although they do possess linear rectification. However, the triode discharge tube of Fig. 1 operates as a rectifier and converter tube and in addition it provides a certain amount of linear amplification over a useful range of its characteristic. The auxiliary alternating current potential which is applied to the control of this tube operates to shift the line of reference for the rectification function. A comparison of Figs. 2 and 3 will show this shift, the new line being through the point $A_x$ of Fig. 3. It will be noted that this point is situated on the linear portion of the rectifier characteristic so that even small variations in amplitude of the incoming impulses result in proportional variations in the rectified current.

If the alternating potential to be rectified be called U and the rectified current I, then the rectifier characteristic is determined by $I=f(U)$. It can be shown mathematically that by increasing U or by superimposing on said alternating potential an alternating potential of another frequency, the term $dI/dU$ assumes an approximately constant value, that is, one approaches the case of linear rectification. This fact also becomes evident from the known standard characteristic fields of the rectifiers which have a curved shape for small control potential amplitudes only, while they are of linear shape for large control potential amplitudes.

Another feature of the invention is clearly shown in Fig. 1 and relates to the direct connection between the output circuit of the tube 1 and the deflecting means of the cathode ray tube 6. The connection as shown is substantially devoid of inductive reactance and accordingly it operates to control the deflection of the electron beam in the tube without retardation.

Figure 2:
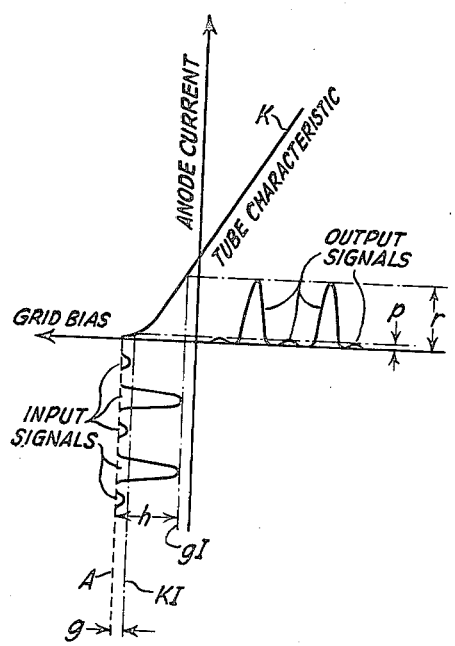
Fig. 2 shows the operating characteristics of a conventional direction-finder system.

Fig. 2 illustrates the basic operation of the arrangement just discussed. K is the characteristic of tube 1. If a certain biasing potential is chosen, the tube is caused to operate at working point A. If, then, the grid of the tube is fed with impulses having an amplitude $g$, impulses of amplitude $p$ will be set up in the anode circuit which are very considerably smaller than the input impulses. But if impulses of amplitude $h$ are impressed upon the grid, then impulses will arise in the plate circuit whose amplitude $r$ is quite proportional to the input impulses. This graphic illustration goes to show that for small amplitudes, in other words, in the minimum or zero point position of the loop, the receiver operates poorly, in other words, that the "minimum-width" is large.

Figure 3:
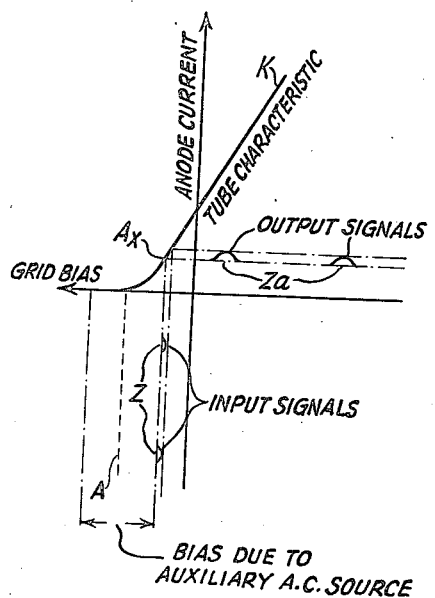
Fig. 3 shows the improved characteristics of the system of our invention.

Now, according to the invention, the receiver is made of the heterodyne type. Fig. 3 illustrates the operation of an arrangement as here disclosed. Tube 1 with characteristic K is again assumed to be impressed with a biasing potential so as to cause the tube to operate at working point A. According to the invention, however, the grid of the tube is impressed with an auxiliary frequency. In the drawing individual oscillations of the said auxiliary frequency are not shown for the reason that they are appreciably faster than the keyed impulses. By the application of the said auxiliary frequency the tube works as if the operating point were at A$_x$. Still, the rectifier properties of the tube are not lost. Thus, if in addition to the said auxiliary frequency and the grid biasing potential, the grid is fed with the impulses Z which may be very small, then in the plate circuit impulses Z$_a$ appear and these are very appreciably larger. By this arrangement proportionality between input and output amplitudes is secured.

This fact may be demonstrated by means of a brief calculation.

The incoming (signal) radio frequency oscillations are assumed to be of a form H.cos $\omega_h t$. At the receiver, an auxiliary oscillation having the form U.cos $\omega_u t$ is added. The aggregate potential which will then be operative at the grid will have this form:

$$U \cos \omega_u t + H \cos \omega_h t = A \cos (\omega_u t - \phi)$$

where $$A = \sqrt{U^2 + H^2 + 2UH \cos (\omega_h - \omega_u) t}$$

and where further $$\phi = f(U, H, (\omega_h - \omega_u) t)$$

In the presence of square-law rectification the variable component of the output amplitude from the rectifier is proportional to $2UH \cos (\omega_h - \omega_u) t$. $U^2$ and $H^2$ in this connection are D. C. components which may be neglected.

In the absence of the heterodyne voltage the output would be in proportion to $H^2 \cos^2 \omega t$. Hence, it will be seen that the use of the heterodyne potential simulates a linearly operating rectifier.

In carrying this receiver arrangement into practice, it is immaterial in what way indication is effected. In the exemplified instance and embodiment here cited, a cathode ray tube is employed. Of course, it is readily feasible to use a mirror type oscillograph instead. In fact, this plan would afford a further advantage in that an exponential characteristic of the mirror type oscillograph can be suitably chosen. Also in this case reproduction of small amplitudes in contrast with large ones is obtainable.

We claim:

1. Apparatus for indicating the reception of directional signals as they approach minimum amplitude, comprising a triode discharge tube whose characteristic is substantially non-linear near the cut-off point and substantially linear over a range somewhat above the cut-off point, a direct current biasing source in series with an auxiliary alternating current source connected between the cathode and grid of said tube, a cathode ray tube having deflecting plates in shunt with a resistor in the output circuit of the first said tube, and means for fixing the values of the direct current biasing potential and of the auxiliary alternating current source in relation to the amplitude of said directional signals so that a substantially linear ratio is maintained between said signals and the energy applied to said deflecting plates.

2. Radio apparatus for the reception of signals the directional significance of which is indicated by their approach to minimum amplitude, comprising a cathode ray tube having deflecting plates for the impress thereon of potentials which vary as a function of the signal amplitude, means for rectifying said signals, said means comprising a discharge tube having at least a cathode, an anode and a control grid, said tube having an input circuit which includes a direct current biasing source, a transformer secondary on which low frequency potentials are impressed, and coupling means whereby the grid is controlled by said signals, an output circuit for said discharge tube including a load impedance in shunt with said deflecting plates of the cathode ray tube, and means for maintaining said low frequency potentials at such value as to shift the working point on the tube characteristic to a linear range of amplification.

GUNTHER ULBRICHT.
RUDOLF WEBER.